E. C. LAMPSON.
AUTOMOBILE LOCK.
APPLICATION FILED DEC. 28, 1916.

1,260,918.

Patented Mar. 26, 1918.
2 SHEETS—SHEET 1.

WITNESSES

INVENTOR
E. C. Lampson
BY
ATTORNEYS

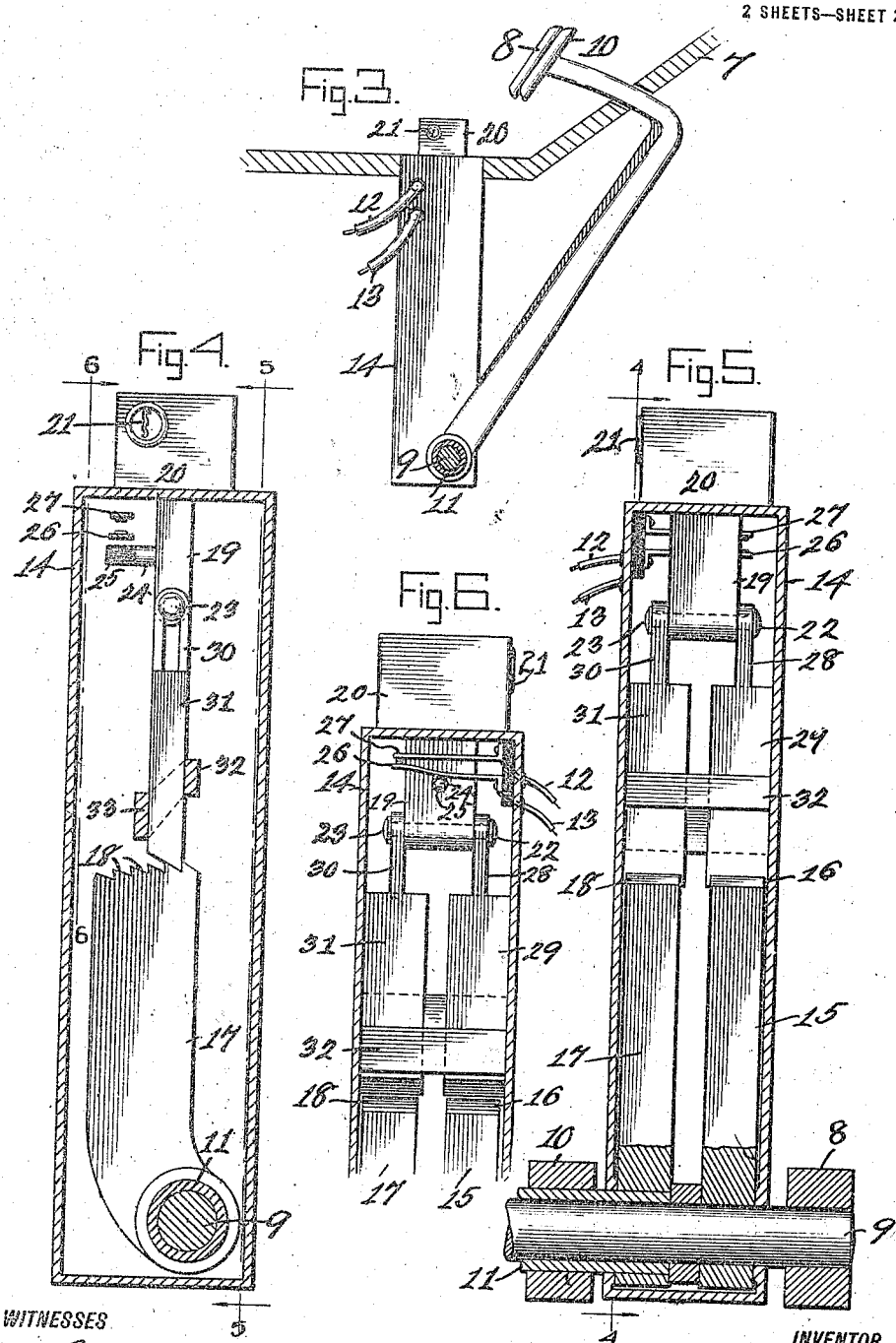

UNITED STATES PATENT OFFICE.

EDWARD C. LAMPSON, OF JEFFERSON, OHIO, ASSIGNOR OF ONE-HALF TO ARTHUR W. GREEN, OF MIDDLEFIELD, OHIO.

AUTOMOBILE-LOCK.

1,260,918.  Specification of Letters Patent.  Patented Mar. 26, 1918.

Application filed December 28, 1916. Serial No. 139,242.

*To all whom it may concern:*

Be it known that I, EDWARD C. LAMPSON, a citizen of the United States, and a resident of Jefferson, in the county of Ashtabula and State of Ohio, have invented certain new and useful Improvements in Automobile-Locks, of which the following is a specification.

My invention relates particularly to a simple and effective means for preventing the operation of an automobile by an unauthorized person through the combination of parts of the automobile with locking means in such manner as to hold inoperative the clutch pedal control shaft or sleeve, to hold the service brake shaft or sleeve in set position, and to interrupt the flow of electricity through one or more of the circuits used either in starting or in subsequent operation of the motor.

The construction of my device is such that, if the starter circuit alone be used, the motor may be left running or may be stopped by other means and, in addition, the construction of my device is such that either the clutch or service brakes may be locked independently of each other or at one and the same time, or one of the two may be left unlocked.

The locking arrangement for the service brakes makes it possible for the chauffeur to set the service brakes when it may be desired to leave the car in the event of the emergency brakes being insufficient or ineffective and, when used as a safeguard against theft, prevents the car from being pushed or dragged away.

The locking portion relating to the clutch prevents the engagement of the motor and clutch and is so graduated that, if desired, a degree of friction may be utilized to permit of slight slipping of the clutch without stalling the motor.

The preferred embodiment illustrated is designed for use in connection with parts of an automobile similar in type to that utilized in an automobile of Studebaker construction, 1916 and 1917 models, but my invention is capable of being adapted to automobiles of other types having therein a clutch operated by means of a clutch control shaft in turn operated by a pedal at the option of the chauffeur, and having a service brake, operated by means of a service brake control shaft in turn operated by a pedal at the option of the chauffeur, and an electric system or systems, the shafts referred to being of either rod or sleeve type to meet conditions.

My invention is fully described in the following specification, of which the accompanying drawings form a part, in which like characters refer to like parts in each of the views, and in which:—

Fig. 3 is a side elevation of my invention with the clutch and service brake pedals in positions while driving the car.

Fig. 4 is a section taken on the line 4—4 of Fig. 5;

Fig. 5 is a section taken on the line 5—5 of Fig. 4; and

Fig. 6 is a section taken on the line 6—6 of Fig. 4.

Figure 1:
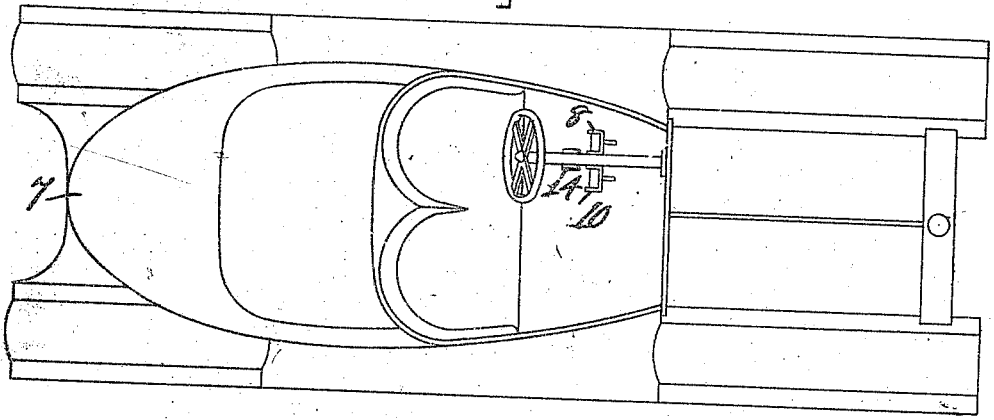
Figure 1 is a plan view of an automobile provided with my invention shown in relative position with respect to the clutch and service brake pedals.
Figure 2:
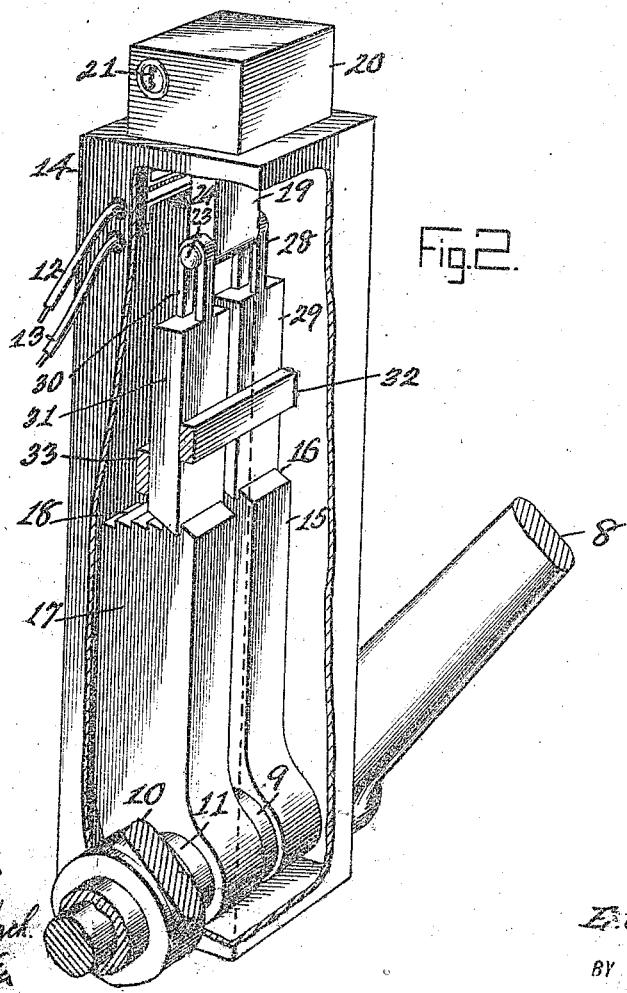
Fig. 2 is a perspective view of my invention detached, with the casing partly broken away to show structural details.

Referring to the drawings, 7 represents an automobile having a clutch pedal 8 carried by a shaft 9 suitably journaled in the frame of the automobile, and having a service brake pedal 10 carried by a sleeve 11 also suitably journaled and freely revoluble on the shaft 9 whereby independent movement of each is possible, and having an electric system, or systems, two conductors of which are shown at 12 and 13.

The shaft 9 passes through a casing 14 secured in any desired manner to the automobile and said shaft carries a sector 15 within the casing and the outer or free end of which is provided with rearwardly directed teeth 16, said sector being splined or otherwise secured to said shaft to move therewith.

The sleeve 11 also extends into the casing 14 and has a sector 17 splined or otherwise secured thereto within said casing and provided with rearwardly directed teeth 18, these sectors being provided to increase the length of the arcs of rotation of the shaft 9 and sleeve 11 in the pedal actuation of either.

Secured to the top of the casing 14 is a lock housing for a lock of any desired construction employing a projecting bolt 19, the casing 20 being provided with a keyhole 21 adapted to receive a key whereby the bolt 19 may be moved inwardly or outwardly of the housing in the manner common to such locks, and it will be noted that the bolt 19 is vertically arranged and carries pins 22 and 23 at its lower edges, and a post 24 at one side provided with an insulated portion 25 arranged directly beneath a terminal 26 on the conductor 13 forming with a terminal 27 on the conductor 12, a circuit-breaker in the electrical system or systems adapted to be closed upon the upward movement of the bolt 19.

Arranged upon the pin 22 is a loop 28 from which a detent 29 depends in such manner as to engage the teeth 16 of the sector 15 when the bolt 19 is in lowered position and similarly arranged on the pin 23 is a loop 30 from which a detent 31 depends in such manner as to engage the teeth 18 on the sector 17, suitable guides 32 and 33 being provided for said detents in their vertical movements and, because of the loops 28 and 30, the detents may rise independently of each other in the forward movement of the respective sectors with the bolt 19 in lowered position though operating to prevent backward movement of the respective sectors through gravity.

The automobile operator desiring to utilize any part or all the parts of my invention inserts the key in the lock and turns the same to allow the bolt 19 to move downward to allow the detents to drop into the paths of movement of the respective sectors the controlling pedals of which have not as yet been moved forwardly, and in this bolt movement the terminal 26 is separated from the terminal 27 and the electric system is broken.

If the clutch pedal be now depressed the sector 15 is moved forwardly, the detent 29 riding over the teeth 16 but dropping into operative engagement with the successive teeth to prevent rearward movement of the said sector, the clutch members being thus separated a distance determined by the degree of sector movement and said clutch members cannot be again brought into engagement except by raising the bolt 19 by means of the proper key.

If the circuit-breaker is arranged in the ignition circuit, the motor stops, but if only in the starting circuit the motor may continue to run but is now out of engagement with the transmission and, in this position of the parts, the service brakes are still free as the operator may prefer to utilize the emergency brakes to prevent movement of the car.

If, however, he desires to lock the car against being pushed or dragged away the operator may depress the service brake pedal to carry the sector 17 forwardly where it is engaged by the detent 31, thus setting the service brakes and preventing their release except by means of the proper key.

Upon desiring to start the car, the operator takes his seat, inserts the key in the lock and turns the same to raise the bolt 19 and, thereby, the detents 29 and 31 out of sector engagement and said sectors may then move rearwardly to throw the clutch in and to release the service brakes, his feet controlling such rearward movement and he may, if found desirable, exert slight forward pressure on the pedals to take strain off the sectors and detents while operating the key to raise the bolt, on both pedals if both sectors are in forward position or only on the forward sector if but one is locked, and this upward bolt movement closes the circuit-breaker to permit starting and operation of the motor.

I have not illustrated the interior of the lock as many forms thereof may be employed to control the raising of the detents, or the movement thereof into and out of operative positions, and various changes may be made in the structural details of the sectors and detents within the scope and spirit of my invention without sacrificing any of its advantages, and I reserve the right to make such changes within the scope of the appended claims.

Having fully described my invention, what I claim as new, and desire to secure by Letters Patent, is:—

1. In an automobile, the combination of a control shaft, a casing on said shaft resting upon but forming no essential portion of the frame supporting parts of the automobile, a detent in said casing, a lock in said casing, means in said casing controlled by said lock for moving said detent into and out of position for operative connection with said shaft, and means for preventing oscillation of said casing on said shaft, and means provided by said casing for holding said detent in position after operative connection with said shaft.

2. In an automobile, the combination of a control shaft, a lever on said shaft, a detent adapted to prevent reverse rotation of said shaft after the same has been moved forwardly by power applied by the operator, to said lever, a lock, means controlled by said lock for moving said detent into and out of operative connection with said control shaft and means governed by said lever for placing the said shaft in locked relation to said detent-operative means, a metal protective casing, resting on the automobile frame, said casing containing said lock, said detent and said detent operative means, said casing providing means therein for holding said detent at operative position after the means controlled by said lock have moved said detent into operative connection with said shaft, a floor-board, and means therein for making the said lock accessible for operation.

3. In an automobile the combination with a control shaft, a lever on said shaft, a detent adapted to prevent oscillation of said shaft after the same has been moved forwardly by power applied by the operator of the automobile to said lever, a lock, means controlled by said lock for moving said detent into and out of operative connection with said control shaft, and means governed by said lever for placing said shaft in locked relation to said detent, an electric system provided with a make-and-break device operable with said lock in harmony with said detent, a metal protecting casing on said shaft and resting upon the supporting frame, of the automobile, said casing containing said lock, and said detent moving means and said make-and-break device and the said means for operating said electrical device, and said casing providing means for holding the detent at the position or positions for operative connection with said control shaft, a floor-board, and means for access to the said lock in said floor-board.

4. In an automobile, in combination, a control shaft, a lever on said shaft, a detent, a lock adapted to move said detent into and out of position for operative connection with said shaft, a metal protective case on said shaft secured in any desirable manner to the supporting frame of automobile to prevent oscillation of said casing, said lock, detent and detent moving means located within said casing, and means in said casing for holding said detent in operative connection with the said shaft after said detent has been so moved by said detent-moving means, and means governed by said lever for placing said shaft in locked relation to said detent at successive radial points on said shaft, a floor-board, and means in said floor-board providing accessibility to said lock.

5. The combination with an automobile provided with a clutch pedal shaft, a brake pedal shaft and an electric system, of means for locking said clutch shaft in inoperative position and for locking said brake shaft in operative position after such shafts have been partially rotated by power externally applied, and for breaking the circuit in said electric system.

6. The combination with an automobile provided with a clutch pedal shaft, a brake pedal shaft, and an electric system; of a toothed sector on each shaft, a detent for each sector, means for moving said detents into and out of sector engagement, and means of breaking said circuit in one movement of said means and for closing said circuit in another movement thereof.

7. The combination with an automobile provided with a clutch pedal shaft and a brake pedal shaft; of a toothed sector on each shaft, a detent for each sector, a bolt supporting said detents, key controlled means for moving said bolt to carry said detents into and out of sector engaging position, and means for permitting independent detent movement to permit independent forward sector movement.

8. The combination with an automobile provided with a clutch pedal shaft, a brake pedal shaft, and an electric system; of a toothed sector on each shaft, a detent for each sector, a bolt supporting said detents, key controlled means for moving said bolt to carry said detents into and out of sector engaging position, a circuit-breaker in said electric system, and means on said bolt for opening said circuit-breaker in one direction of bolt movement and for closing the same in the other direction of bolt movement.

9. In a lock for automobiles provided with an element rotatable through an arc and an electric system, a toothed sector carried by said element, a gravity actuated detent adapted to engage said sector, key controlled means for moving said detent into and out of engagement with said sector, and means carried by said detent for breaking the circuit in said electric system in one movement of the detent and for closing said circuit in the opposite movement of said detent.

10. In a lock for automobiles provided with an element rotatable through an arc, and an electric system, a toothed sector carried by said element, a detent adapted to engage said sector, means for moving said detent into and out of engagement with the said sector, and means carried by said detent for breaking the circuit in said electric system in one movement of the detent and for closing said circuit in the opposite movement of the said detent.

11. In a device of the character described, a clutch control shaft, a brake control shaft, a lever for each of said shafts, a detent for each of said shafts, said detent adapted to prevent rotation of its shaft, a lock, means controlled by the lock for moving said two detents into and out of position for operative connection with their respective shafts, and means governed by said levers for placing either or both of said shafts in locked relation to their respective detents.

12. A device of the described character, comprising a clutch control shaft, a brake control shaft, a lever for each of said shafts, a detent for each of said shafts adapted to prevent rotation of such shaft, a lock, means controlled by the lock for moving the detents into and out of position for operative connection with their respective shafts, and means governed by said levers for placing either or both of the said shafts in locked relation to their respective detents, combined with an electrical make and break device operable by said lock in harmony with such movement of the detents.

13. In an automobile, the combination of a control shaft, a lever on said shaft, a detent adapted to prevent reverse rotation of said shaft after the same has been moved forwardly by power applied by the operator, to said lever, a lock, means controlled by said lock for moving said detent into and out of operative connection with said control shaft and means governed by said lever for placing the said shaft in locked relation to said detent-operative means, a metal protective casing, on said shaft resting on the automobile frame but forming no essential part of the supporting frame thereof, said casing containing said lock, said detent and said detent operative means, said casing providing means therein for holding said detent at operative position after the means controlled by said lock have moved said detent into operative connection with said shaft, a floor-board and means therein for making the said lock accessible for operation, and means for holding the said casing from oscillation on said shaft.

EDWARD C. LAMPSON.